United States Patent [19]

Gartner et al.

[11] Patent Number: 5,168,142
[45] Date of Patent: Dec. 1, 1992

[54] METHOD FOR FABRICATING A CLUTCH CYLINDER-DRUM ASSEMBLY

[75] Inventors: Mark D. Gartner, Dearborn; Dennis R. Kolodziej, Redford Twp., Wayne Co., both of Mich.

[73] Assignee: Ford Motor Company, Dearborn, Mich.

[21] Appl. No.: 705,996

[22] Filed: May 28, 1991

[51] Int. Cl.⁵ .............................................. B23K 26/00
[52] U.S. Cl. .................................. 219/121.64; 219/93
[58] Field of Search ........................ 219/121.63, 121.64, 219/121.13, 121.14, 117.1, 93; 192/70.2

[56] References Cited

U.S. PATENT DOCUMENTS

| | | | |
|---|---|---|---|
| 1,968,976 | 8/1934 | Van Halteren | 219/93 |
| 1,977,567 | 10/1934 | Eksergian | 219/93 |
| 3,949,186 | 4/1976 | Nakayama et al. | 219/121.14 |
| 4,724,745 | 2/1988 | Sumiya et al. | 192/70.2 X |
| 4,758,704 | 7/1988 | Kogel | 219/121.64 |
| 4,791,269 | 12/1988 | McLean et al. | 219/121.64 |
| 4,833,295 | 5/1989 | Locker et al. | 219/121.63 |
| 4,866,242 | 9/1989 | Martyr | 219/121.64 |
| 4,868,365 | 9/1989 | Farone et al. | 219/121.64 |
| 4,916,284 | 4/1990 | Petrick | 219/121.64 |
| 4,949,821 | 8/1990 | Murota et al. | 192/3.21 |
| 4,953,778 | 9/1990 | Critton et al. | 228/173.6 |

Primary Examiner—C. L. Albritton
Attorney, Agent, or Firm—Roger L. May; Joseph W. Malleck

[57] ABSTRACT

An improved method is disclosed for fabricating a clutch cylinder-drum assembly for use in a vehicle drivetrain wherein no additional manufacturing steps are needed to remove weld spatter or weld material from the interior of the clutch cylinder. In a first embodiment, a drum has an annular axially protruding projection which is forcibly positioned against a clutch cylinder. Electrical current is passed through the projecton to create a weld connection securing the clutch cylinder to the drum. A second embodiment uses a laser beam weld to join these components.

14 Claims, 3 Drawing Sheets

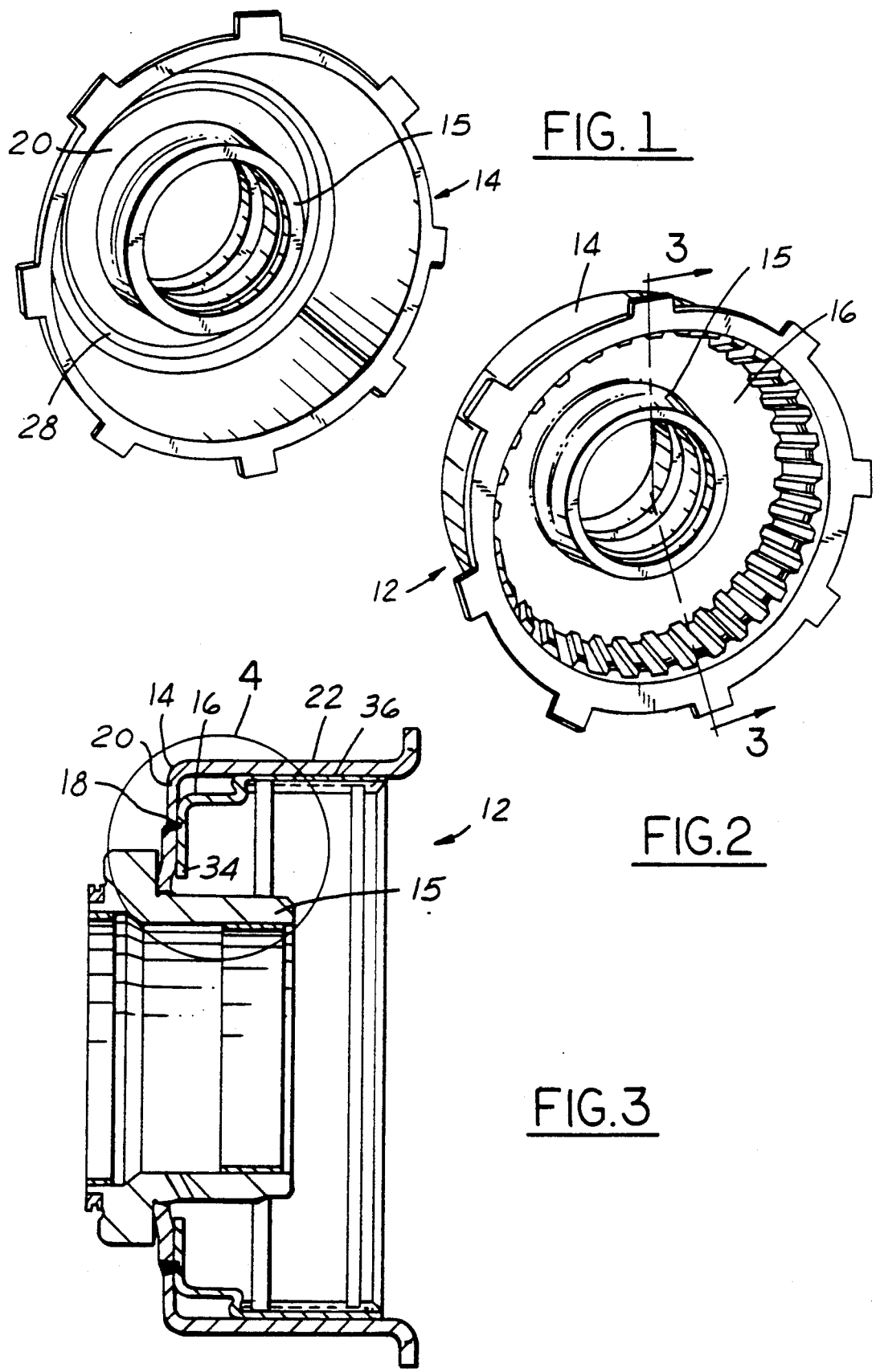

METHOD FOR FABRICATING A CLUTCH CYLINDER-DRUM ASSEMBLY

TECHNICAL FIELD

This invention relates generally to a method for fabricating clutch cylinder-drum assemblies for vehicle drivetrains, and in particular, to an improved method using resistance or laser beam weld techniques to join a clutch cylinder to a drum.

BACKGROUND ART

Conventionally, two methods of manufacturing have been employed to fabricate clutch cylinder-drum assemblies for use in automatic transmissions or transaxles of vehicle drivetrains. The first utilizes an electron beam weld method and the second involves integrally casting the assembly and machining it to a desired configuration. Each method has disadvantages and limitations.

The electron beam method is applied to a clutch cylinder and drum, each of which is generally formed through a stamping operation. The clutch cylinder includes an annular, radially extending base plate connected to an axially extending cylindrical member. The drum includes an annular, radially extending end plate adjoining an axially extending cylindrical wall. The clutch cylinder is placed within the drum, with the base plate abutting the end plate. An electron beam is directed to the inside of the clutch cylinder with the beam penetrating through the base and end plates. Alternatively, the electron beam is applied to the exterior of the end plate, penetrating into and through the end and base plates. Generally, due to the size and complexity of the electron beam welding apparatus, the components to be welded are rotated about a fixed welding apparatus to form an annular weld.

One disadvantage of this method is that electron beam welding typically requires a great deal of maintenance to keep the welding apparatus operating properly. Electron beam welding generally requires a vacuum chamber which reduces barometric pressure to the order of $1 \times 10^{-1}$ to $1 \times 10^{-2}$ Torr. (Atmospheric pressure is approximately 760 Torr). If air or other gases are present, the electron beam will scatter, thus deteriorating the effectiveness of the weld procedure. This high vacuum tends to draw metal vapors from workpieces, thereby requiring removal of these vapors. The voltage used across the workpieces is in the range of 30,000-200,000 volts, thus requiring an expensive power supply.

Second, the electron beam methods known to have been used to date have penetrated the inner or exposed surface of the annular base plate of the clutch cylinder. This produces warping, and weld spatter on this surface. Unless weld spatter is removed, at a later date it may break free and contaminate the transmission fluid. In turn, this may cause clogging in the flow of transmission fluid or a valve body located in the transmission or transaxle system. Further, these contaminants may increase wear to parts within the transmission or transaxle.

The warping of the exposed inner surface of the clutch cylinder may cause further problems. If the surface is not flat, a piston operating within the clutch cylinder may become ramped or cocked, allowing for fluid leakage or piston interference and seizure during operation of the transmission or transaxle. As other components of the transmission or transaxle often locate in relation to this surface, flatness of the exposed surface is required for their proper positioning. Consequently, an additional manufacturing step may be required to machine this surface to achieve a desired flatness.

Finally, the electron beam weld method uses X-ray radiation. This is potentially dangerous to operators, and, therefore, lead shielding or heavy sections of machine base castings are required around the welding apparatus. Shielding makes observation of the welding process more difficult, and interferes with steps involved in correcting problems associated with the welding apparatus and procedure. Also, in some States, official certification and inspections are required to operate an electron beam welder.

The second conventional method of manufacturing a clutch cylinder-drum assembly involves forming the assembly directly in cast iron and machining it to the proper configuration. This method also has a number of drawbacks.

First, cast iron is a more expensive material than the metal typically used to produce the stamped metal components. Second, facility and tooling costs are also greater. Cast iron requires a mold, is difficult to machine and in some instances, residue and chips remain after machining. These pieces may break free and contaminate the transmission fluid, thereby causing wear and clogging problems as discussed above. Finally, cast iron clutch cylinder-drum assemblies generally are significantly heavier than are those made of stamped metal components.

Methods for joining annular components together are known. One example is Nakayama et al, U.S. Pat. No. 3,949,186, which discloses a method using laser beam, electron beam or plasma welding techniques to join precision-machined hollow bodies to other metallic members. A concentrated beam of heat-producing energy is directed across and peripherally about the axially extending interface of the bodies to be joined. This reference suggests using the method for adjoining concentric precision machined wave guides for propagation of electromagnetic radiation.

DISCLOSURE OF THE INVENTION

The present invention includes a method for fabricating a clutch cylinder-drum assembly for use in vehicle drivetrains wherein the interior surface of a clutch cylinder remains free of weld spatter. The clutch cylinder is placed within a drum, with a base plate on the clutch cylinder being juxtaposed with an end plate on the drum. Either a resistance or a laser weld technique is used to form a weld connection between interfacing surfaces of the end and base plates wherein the weld connection does not penetrate the interior surface of the clutch cylinder. Therefore, additional manufacturing steps to remove weld spatter or other weld material from this surface, or to machine the surface flat, are minimized.

The resistance and laser weld techniques are used to join the clutch cylinder to the drum without using a vacuum chamber. Also, these techniques do not produce X-ray radiation, unlike electron beam welding, and therefore avoid radiation-related safety risks.

A particular advantage of the resistance weld technique is that no rotating parts are necessary to form the weld connection. In contrast, other welding techniques require that either the apparatus for welding, or the components to be welded, be rotated relative one another to form an annular weld. The resistance weld technique usually requires less time as the entire weld connection is formed simultaneously. Therefore, more clutch cylinder-drum assemblies may be fabricated in a given time period. Also, fewer sets of welding apparatus are required to fabricate a particular number of the assemblies in a given time. This is an important consideration when high volume production is required.

An object of the present invention is to overcome the disadvantages and problems encountered with prior methods of fabricating clutch cylinder-drum assemblies for vehicle drivetrains.

In particular, it is an object to provide a lower maintenance and more cost-effective method than is available by other methods of clutch cylinder-drum fabrication now in use.

Another object is to provide a method of fabrication of a clutch cylinder-drum assembly in which the inner, exposed surface of the clutch cylinder remains free of weld material and other loose particulates that otherwise might be produced during fabrication.

Yet another object is to a provide a method of fabrication wherein no X-ray radiation is produced and no lead shielding is needed.

Still another object is to provide a method of fabrication which does not require rotation between the welding apparatus and the components being welded and accordingly, which requires less time to form a complete weld connection.

Other objects, features and advantages will become more readily apparent from the following description and the accompanying drawings.

BRIEF DESCRIPTION OF DRAWINGS

FIG. 1 is a perspective view of a drum with an annular projection located on an interfacing surface of an end plate;

FIG. 2 is a perspective view of a drum with a clutch cylinder located therein;

FIG. 3 is a sectional view taken along planes co-linear with line 3—3 of FIG. 2 showing the clutch cylinder secured within the drum;

BEST MODES FOR CARRYING OUT THE INVENTION

Figure 4:
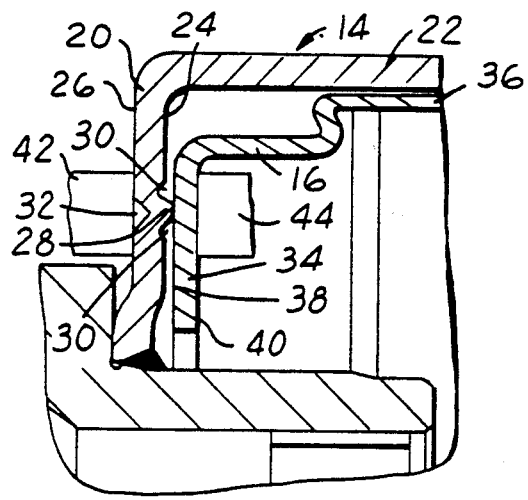
FIG. 4 is an enlarged fragmentary sectional view of the area 4 of FIG. 3 showing the clutch cylinder juxtaposed with the drum before resistance welding.

The present invention includes a method for fabricating a clutch cylinder-drum assembly for use in an automatic transmission or transaxle of a vehicle drivetrain wherein the radially extending, inner exposed surface of the clutch cylinder remains free of weld spatter.

FIGS. 1-3 show a clutch cylinder-drum assembly 12 which includes a drum 14 and a clutch cylinder 16 joined by a weld connection 18. Generally, a hub 15, as shown in FIG. 1, is welded to drum 14 prior to the addition of the clutch cylinder 16. Weld connection 18 is preferably formed by using either a resistance weld or laser beam weld technique. The drum 14 and the clutch cylinder 16 are each formed in a stamping operation. One preferred material is 1006 aluminum killed, draw quality, low carbon, cold rolled steel. Alternate materials include steel with up to 0.44% carbon and high strength, low alloy steels.

Figure 5:
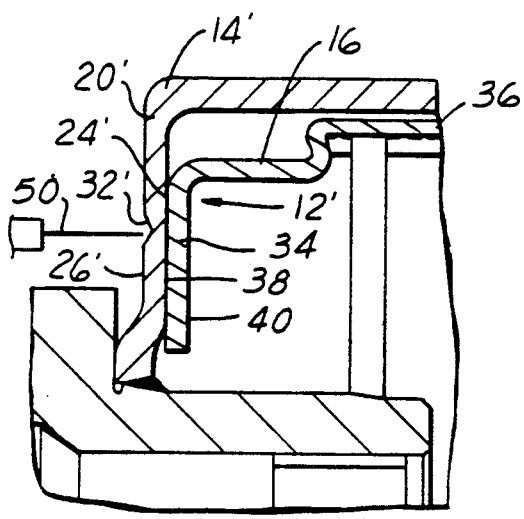
FIG. 5 is an enlarged fragmentary sectional view, similar to FIG. 4, showing the clutch cylinder juxtaposed within the drum prior to laser welding.

When using the resistance weld technique, the configuration of drum 14 is slightly different from the drum 14' which is used with the laser beam technique (FIG. 5). The resistance weld (FIG. 4) calls for the drum 14 to include an annular end plate 20 connected to an axially extending cylindrical wall 22. End plate 20 has radially extending interfacing and exposed surfaces 24 and 26, with exposed surface 26 being on the axially exterior side of the drum 14. Interfacing surface 24 has an annular axially inwardly protruding or extending projection 28 and a pair of annular grooves 30 radially spaced apart therefrom. The projection 28 overlies a channel 32 defined in the associated exposed surface 26, the channel 32 extending toward the projection 28. Preferably, the operation that creates projection 28 simultaneously forms channel 32.

In the preferred embodiment, the end plate 20 is about 0.170" thick. Projection 28 is approximately 0.040" high and has a radius of curvature of about 0.100", with its apex located radially about 2.30" from the axial centerline of clutch cylinder-drum assembly 12. Grooves 30 are about 0.015" deep and have a radius of curvature of about 0.030". Channel 32 is approximately 0.050" deep.

Clutch cylinder 16 has an annular base plate 34 connected to an axially extending cylindrical member 36. Base plate 34 has radially extending, associated interfacing and exposed surfaces 38 and 40. Base plate 34 has a thickness of approximately 0.100". Exposed surface 40 is generally planar before and after being subjected to the weld method discussed herein and may be used as a datum from which other components of the transmission or transaxle may be located.

This invention also contemplates placing a projection on the interfacing surface 38 or having mating projections on both of the interfacing surfaces 24 and 38. Accordingly, grooves and channels, respectively, may also be located on the interfacing and exposed surfaces of the base plate. Further, the projections could be intermittent, rather than forming a continuous annular projection, when hermetically sealing welds are not required.

Generally, the clutch cylinder 16 is placed within drum 14, so that the interfacing surfaces 38 and 24 of the base and end plates 34 and 20 are juxtaposed. There exists about a 0.010" annular gap between cylindrical wall 22 and cylindrical member 36. A closure force is applied across the base and end plates 34 and 20 so that they are urged into adjoining relationship. Then a means for welding is provided whereby weld connection 18 is formed between the base and end plates 34 and 20 without the weld connection 18 penetrating the exposed surface 40 of the base plate 34 so that the exposed surface 40 thereof remains free of weld spatter.

More specifically, clutch cylinder 16 is placed concentrically within drum 14 with interfacing surface 38 of base plate 34 juxtaposed and opposing the interfacing surface 24 of the end plate 20. The annular gap between cylindrical wall 22 and cylindrical member 36 prevents electrical current from passing thereacross. See FIGS. 2 and 4. Annular outer and inner electrodes 42 and 44, having flat annular surfaces sized generally to mate with exposed surfaces 26 and 40, are placed against these surfaces. Portions of outer and inner electrodes 42 and 44 are shown schematically in FIG. 4.

An illustrative weld schedule using the resistance weld technique for creating weld connection 18 for a drum and clutch cylinder with the dimensions described above, is shown below in Table 1 and graphically in FIGS. 6 and 7.

TABLE 1
WELD SCHEDULE FOR RESISTANCE WELD METHOD

| Time in Periods | 0–30 | 30–82 | 82–86 | 86–180 | 180–192 | 192–222 | 222–232 |
|---|---|---|---|---|---|---|---|
| Current in Kiloamperes | 0 | 332 | 0 | 370 | 370 | 0 | 0 |
| Closure Force (× 1000 lbs) | 0–24 | 24 | 24 | 24 | 40 | 40 | 40–0 |

One Period = 1/60 second

Figure 6:
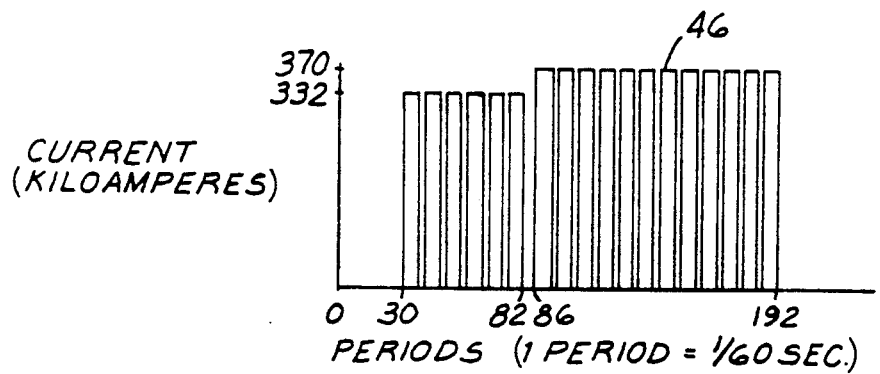
FIG. 6 is a graph illustrative of welding currents as a function of time during the resistance weld method.
Figure 7:
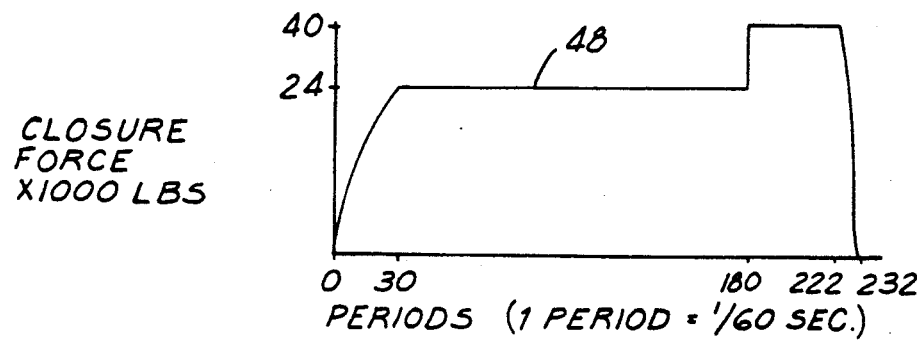
FIG. 7 is a graph illustrative of closure forces applied across the drum and clutch cylinder as a function of time during the resistance weld method.

FIG. 6 shows the current, i.e. histogram 46, applied across electrodes 42 and 44, and accordingly, projection 28 and opposing interfacing surface 38 during the resistance weld procedure. A closure force is maintained across electrodes 42 and 44 and the interfacing surfaces 24 and 38 to apply pressure upon projection 28. FIG. 7 shows the closure force, curve 48, applied across the electrodes 42 and 44 during the resistance welding technique. The horizontal axis in FIGS. 6–7 shows time in periods wherein each period is equal to 1/60 second.

To practice the invention over periods 30–82, a preheat current of about 332 kiloamperes is applied in 6 preheating pulses. Each pulse comprises the current being "on" for 7 periods and then "off" for 2 periods. Between periods 82 and 86, the current is off. A welding current of about 370 kiloamperes, covering time periods 86–192, is then applied for a total of 12 pulses. Again, each pulse consists of 7 periods of the current being "on" and 2 periods of the current being "off".

The closure force is increased from 0 to about 24,000 pounds over the first 30 periods. The closure force is maintained at that level for the next 150 periods, then increased to about 40,000 pounds for 42 periods and finally reduced to zero over the next 10 periods.

Figure 4A:
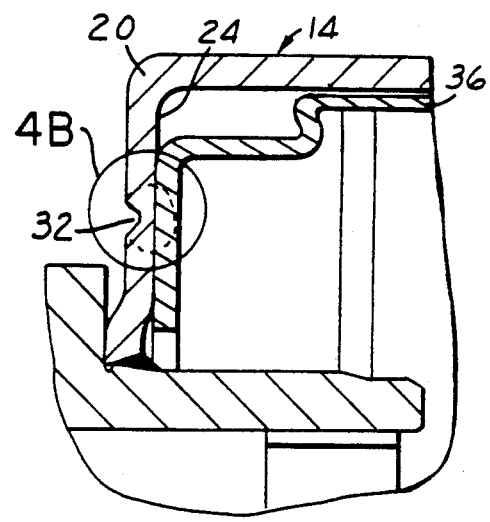
FIG. 4A is an enlarged fragmentary sectional view, similar to FIG. 4, of the clutch cylinder-drum assembly following resistance welding.
Figure 4B:
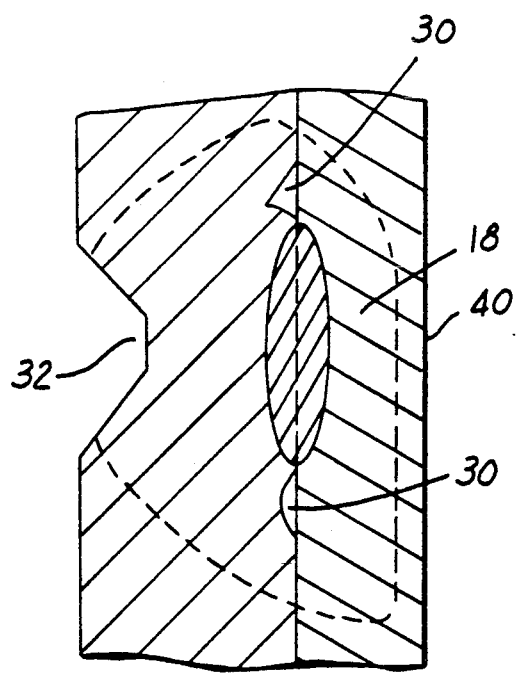
FIG. 4B is a further enlarged fragmentary sectional view of area 4B in FIG. 4A showing further details of a weld connection.

The preheat of about 52 periods warms projection 28. The current is then turned off for 4 periods to allow for heat distribution throughout projection 28. The welding current of about 370 kiloamperes is applied for approximately 108 periods, during which time the weld connection 18 is formed. The closure force is increased from 24,000 pounds up to 40,000 pounds to ensure that the projection 28 is flattened, such that there is face-to-face contact between the interfacing surfaces 24 and 38, as shown in FIGS. 4A and 4B. The closure force is maintained for 30 periods after the current is removed to allow weld connection 18 to cool under pressure. The entire welding process takes less than 240 periods, or 4 seconds.

The combination of heat and pressure creates weld connection 18 and results in the projection 28 being flattened, with a portion of its material flowing into either of grooves 30 located on the interfacing surface 24. The remainder of the material from projection 28 is pressed and flows into channel 32 on exposed surface 26. Weld connection 18 forms an hermetic seal between the interfacing surfaces 24 and 38. Preferably, the exposed surface 40 has contours which are substantially unchanged before and after the formation of weld connection 18. As seen in FIGS. 4 and 4A, the exposed surface 40 retains its original relatively flat condition as it abuts against the flat surface of inner electrode 44 throughout the formation of weld connection 18.

The general shape of the heat-affected zone of weld connection 18, as it appears when sectioned, is shown as the outer dashed outline in FIG. 4B. The inner solid line indicates the weld fusion zone as confirmed by metallographic viewing. Weld connection 18 is similar to a forge weld in that it is formed with heat and pressure and without a significant portion of the projection material going into a molten state. If insufficient heat is provided during the welding, weld connection 18 may not properly form. Conversely, too rapid of heating may cause projection 28 to melt and expel weld spatter between the interfacing surfaces 24 and 38 o else projection 28 may penetrate exposed surface 40 and generate weld spatter.

A second variation of this method utilizes a laser beam weld instead of the resistance weld. Again, no weld spatter remains in the interior of the clutch cylinder 16 after welding. Many of the problems associated with the electron beam or casting methods of producing the clutch cylinder-drum assembly 12 are overcome.

In FIG. 5, clutch cylinder-drum assembly 12' comprises a drum 14' and clutch cylinder 16. Clutch cylinder 16 is identical to that described above when utilizing the resistance weld technique. Drum 14', however, has a flat interfacing surface 24' rather than a projection 28 and grooves 30 as used with resistance weld technique. Channel 32' is used to reduce the distance a laser beam 50 must penetrate before reaching the base plate 34 of clutch cylinder 16. Channel 32' is again approximately 0.050" deep.

Clutch cylinder 16 is placed concentrically within drum 14'. Again, an approximate 0.010" annular gap exists between cylindrical wall 22' and cylindrical member 36. A closure force of about 4000 lbs is then applied across the drum 14' and clutch cylinder 16 with interfacing surface 24' being juxtaposed with interfacing surface 38. A laser beam 50 is applied to channel 32', penetrating through the end plate 20' and partially into base plate 34. The drum 14' and clutch cylinder 16 are rotated relative to laser beam 50 such that an annular weld connection 18' is formed, thereby fabricating clutch cylinder-drum assembly 12'. A shielded gas, preferably helium, is used in conjunction with the laser weld to minimize the oxides formed in the weld connection 18'. The weld connection 18' hermetically seals interfacing surfaces 24' and 38, thereby preventing leakage of transmission fluid. Again, the exposed surface 40 of base plate 34 remains free of distortion, weld spatter, and weld material.

Figure 5A:
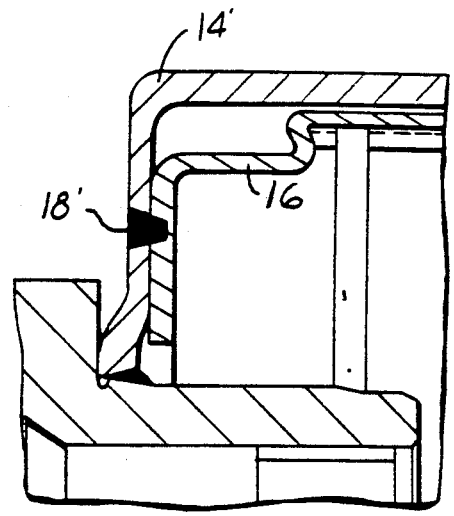
FIG. 5A is an enlarged fragmentary sectional view, similar to that of FIG. 5, showing the clutch cylinder secured to the drum through a weld connection which is formed by laser welding.

For a drum 14' and a clutch cylinder 16 of the dimensions and configurations described above, i.e. having the same size as in the resistance method, but without the projection 28 and the grooves 30 the laser beam weld is performed with about 5,000–6,000 watts of power at 25–30 amperes of current, at a feed rate of 60–70''/min., using a shielding Helium gas flowing at about 20 ft$^3$/hr, which produces a resultant weld connection 18'. FIG. 5A illustrates weld connection 18' connecting drum 14' and clutch cylinder 16.

Welds of different sizes, used to join clutch cylinders and drums different in size and configuration from that described above, will require weld parameters, i.e. weld schedules, projection, groove and channel sizes, differing from those described above with respect to using the resistance and laser weld techniques. The above specific description of the method of fabricating a clutch cylinder-drum assembly using either a resistance or a laser weld technique, is intended to be illustrative and not restrictive.

While in the foregoing specification this invention has been described in relation to certain preferred parameters thereof, and many details have been set forth for purposes of illustration, it will be apparent to those skilled in the art that the invention is susceptible to alteration and that certain other details described herein can vary considerably without departing from the basic principles of the invention.

We claim:

1. A method for fabricating a clutch cylinder-drum assembly for use in a vehicle drivetrain, comprising the steps of:
   providing a drum having an annular end plate connected to an axially extending cylindrical wall, the end plate having radially extending exposed and interfacing surfaces;
   providing a clutch cylinder having an annular base plate connected to an axially extending cylindrical member, the base plate having radially extending exposed and interfacing surfaces;
   placing the clutch cylinder within the drum, so that the interfacing surfaces of the base and end plates are juxtaposed;
   applying a closure force across the base and end plates so that they are urged into adjoining relationship; and
   providing means for welding, whereby a weld connection is formed between the base and end plates without the weld connection penetrating the exposed surface of the base plate so that the exposed surface thereof remains free of weld material, thereby avoiding post-finishing steps otherwise necessary to remove such material from the clutch cylinder and minimizing dimensional changes therein.

2. The method of claim 1 wherein the step of providing means for welding comprises applying an electrical current across the base and end plates, thereby forming the weld connection.

3. The method of claim 2 wherein at least one of the interfacing surfaces has a projection which extends towards an opposing interfacing surface, wherein the weld connection therebetween is formed by localized heat created by electrical current passing through the projection and the opposing interfacing surface.

4. The method of claim 3 wherein the projection is annular and the weld connection seals the interfacing surfaces of the base and end plates.

5. The method of claim 4 wherein at least one of interfacing surfaces further defines at least one annular groove into which the projection may flow during formation of the weld connection.

6. The method of claim 5 wherein the at least one annular groove comprises two annular grooves which are disposed on opposite sides of the projection.

7. The method of claim 3 wherein the projection overlies a channel defined in the associated exposed surface, the channel extending toward the projection, the projection flowing at least partially into the channel during formation of the weld connection.

8. The method of claim 7 wherein the closure force and localized heat cause the projection to flow into the annular groove and the annular channel.

9. The method of claim 8 wherein the exposed surface of the base plate has dimensions which are substantially unchanged before and after formation of the weld connection.

10. The method of claim 1 wherein the step of providing means for welding includes applying a laser beam to the end plate from the exterior thereof, the laser beam penetrating through the end plate and partially penetrating the base plate.

11. The method of claim 10 wherein the weld connection is annular and seals the interfacing surfaces of the base and end plates.

12. The method of claim 11 wherein the exposed surface of the end plate has an annular channel, thereby reducing the thickness of the end plate the laser beam must penetrate before impinging upon the interfacing surface of the base plate.

13. A method for fabricating a clutch cylinder-drum assembly for use in a vehicle drivetrain, comprising the steps of:
   providing a drum having an annular end plate connected to an axially extending cylindrical wall, the end plate having radially extending exposed and interfacing surfaces;
   providing a clutch cylinder having an annular base plate connected to an axially extending cylindrical member, the base plate having radially extending exposed and interfacing surfaces and at least one of the interfacing surfaces of the end and base plates having a projection which protrudes towards the other interfacing surface;
   placing the clutch cylinder concentrically within the drum so that the projection and the other interfacing surface of the base and end plates are juxtaposed;
   applying a closure force across the base and the end plates so that the projection and the interfacing surface are urged into adjoining relationship; and
   providing means for welding including applying an electrical current across the end and base plates whereby a weld connection is formed between the projection and the other interfacing surface as a result of localized heat created by the electrical current passing therebetween without the weld connection penetrating the exposed surface of the base plate so that the exposed surface of the base plate remains free of weld material.

14. A method for fabricating a clutch cylinder-drum assembly for use in a vehicle drivetrain, comprising the steps of:

providing a drum having an annular end plate connected to an axially extending cylindrical wall, the end plate having radially extending exposed and interfacing surfaces with the exposed surface of the end plate having an inwardly protruding annular channel reducing the thickness of the end plate;

providing a clutch cylinder having an annular base plate connected to an axially extending cylindrical member, the base plate having radially extending exposed and interfacing surfaces;

placing the clutch cylinder within the drum, so that the interfacing surfaces of the base and end plates are juxtaposed;

applying a closure force across the base and the end plates so that they are urged into adjoining relationship; and providing means for welding including applying a laser beam to the inwardly protruding channel, the laser beam penetrating through the end plate and partially penetrating into the base plate whereby a weld connection, which hermetically seals the interfacing surfaces of the end and base plates, is formed without the weld connection penetrating the exposed surface of the base plate so that the exposed surface of the base plate remains free of weld material.

* * * * *